(12) United States Patent
Snyder (10) Patent No.: US 6,351,209 B1
(45) Date of Patent: Feb. 26, 2002

(54) SECURITY SYSTEM (75) Inventor: Brian Snyder, Sun City, CA (US)

(73) Assignee: Ultimate Security Systems Corporation, Irvine, CA (US)

( * ) Notice: Subject to any disclaimer, the term of this patent is extended or adjusted under 35 U.S.C. 154(b) by 141 days.

(21) Appl. No.: 09/592,161

(22) Filed: Jun. 12, 2000

(51) Int. Cl.$^7$ .............................................. B60R 25/10
(52) U.S. Cl. ...................... 340/426; 340/427; 340/429; 340/432; 340/425.5; 340/571
(58) Field of Search ................................ 340/426, 427, 340/432, 429, 568, 571, 693, 425.5, 825.72

(56) References Cited

U.S. PATENT DOCUMENTS

| | | | | |
|---|---|---|---|---|
| 4,141,332 A | * | 2/1979 | Wyler | 340/64 |
| 5,431,244 A | * | 7/1995 | Possobom | 340/426 |
| 5,453,730 A | * | 9/1995 | De-Grinis et al. | 340/426 |
| 5,548,164 A | * | 8/1996 | Hillard et al. | 340/426 |
| 6,026,773 A | * | 2/2000 | Labelle | 123/179.3 |

* cited by examiner

Primary Examiner—Jeffery Hofsass
Assistant Examiner—Hung Nguyen
(74) Attorney, Agent, or Firm—Drummond & Duckworth (57) ABSTRACT

A security system for selectively enabling and disabling the internal combustion engine of a vehicle is provided. The security system includes a security module which selectively interrupts current to or from crucial vehicle subsystems which are necessary for engine ignition or engine operation. The security module attaches and locks to the electrical terminal of a vehicle subsystem so that the security module cannot be removed from the engine compartment of a vehicle without removing the entire vehicle subsystem. Moreover, the security module covers and isolates the electrical terminal of the vehicle subsystem so as to electrically isolate the electrical terminal from unauthorized access. The security system further includes a controller and a switching element which are located within the security module for selectively controlling the flow of current from a conductive path to or from the vehicle subsystem which is sought to be controllably enabled and disabled. In a preferred embodiment, the security module attaches and locks directly to the initiate stud of a vehicle's solenoid to selectively control the activation of the solenoid for starting engine ignition. In alternative preferred embodiments, the security module attaches and locks directly to the power terminals of the solenoid, the power terminals of a vehicle's starter motor, or the positive terminal of the vehicle's battery.

23 Claims, 4 Drawing Sheets

SECURITY SYSTEM

BACKGROUND OF THE INVENTION

The present invention relates to vehicular security systems. Even more particularly, the present invention relates to security systems for disabling electrical subsystems of a vehicle for preventing unauthorized activation. Moreover, the present invention relates to preventions of joyriding and the theft of automobiles which have resulted in substantial economic loss across this country.

Although a substantial number of anti-theft devices have been devised, "professional" and even amateur thieves are adept at overriding such devices and "hot-wiring" a vehicle for removal.

Attempts have been made to secure a vehicle by providing locks to the hood and doors of the vehicle making the interior of the vehicle difficult to access. Further attempts have been made to secure the interior of a vehicle by redesigning the window opening to prevent against the insertion of wire or door "jimmies" for retracting the door lock. However, individuals intent on removing an automobile normally have little problem gaining access to the interior of the vehicle using an assortment of tools, including simply breaking the driver's side window. Once access to the interior of the vehicle is obtained, the engine compartment can easily be accessed by actuation of the hood unlock lever enabling car thieves to hot-wire the engine.

Key actuated and combination type lock switches have been devised to prevent unauthorized activation of various electrical circuits, such as the ignition circuit, distributor system, power system and the like in motor vehicles to prevent theft. These locks include electrically coded keys, mechanically coded keys, digital entry keypads, electro-optically coded keys and radio frequency (RF) keys. Unfortunately, there are known methods for defeating each of these locking systems by bypassing the locking system such as by hot-wiring the locking system or by illegally capturing and rebroadcasting RF security codes.

Additional security systems have been directed to deactivating the starter solenoid, starter motor and/or the distributor. Electrical energy to the winding of a starter solenoid actuates a plunger which closes a circuit between the vehicle's battery and the starter motor. The starter solenoid simultaneously actuates a shift lifter which forces a pinion gear into meshing engagement with the vehicle's flywheel to thereby mechanically connect the starter motor to the engine during vehicle ignition. The starter motor is contained in a housing typically located beneath the internal combustion engine of a vehicle. The starter motor includes a rotatable armature which engages the vehicle's flywheel. When current is supplied through the starter solenoid, the starter motor causes the armature to rotate, thereby rotating the vehicle flywheel causing the internal combustion engine to "start". Meanwhile, the distributor controls the firing sequence of the engine spark plugs to enable the engine to continue running.

Several attempts have been made to deactivate or disable each of these engine subsystems to prevent unauthorized movement of a vehicle. For example, U.S. Pat. No. 4,141,332 describes an encoder/decoder system for shorting the ignition key switch. U.S. Pat. No. 5,942,807 describes a theft deterrent system which includes a stopper for precluding engagement of the starter motor drive gear to the flywheel. Meanwhile, U.S. Pat. No. 4,733,638 describes a radio frequency transmitter/receiver system which requires activation prior to operating the vehicle's starter motor.

U.S. Pat. No. 5,548,164 describes a security module which attaches to a vehicle's starter solenoid. The security module includes an internal switch for interrupting power to the starter solenoid's power terminal. Similarly, U.S. Pat. No. 6,026,773 describes an anti-theft system which is connected in series between a vehicle's battery and the vehicle's starter motor.

Unfortunately, all of the previous attempts to provide automotive security systems suffer from serious drawbacks. For example, many systems which impede activation of the electrical systems of a vehicle, such as the solenoid, starter or distributor, can be overcome by simple removal of the alarm system or by shorting the alarm system. Meanwhile, the system described in U.S. Pat. No. 4,733,638 requires an entirely new starter housing which would be difficult and expensive to construct, and would have to be built in numerous configurations to fit within a variety of vehicle engine housings. U.S. Pat. No. 5,548,164 describes a security system which attaches directly to the power terminal of a starter solenoid. To impede removal of the security module from the starter solenoid, additional housings are locked in place over the terminals of the starter solenoid to impede their access by unauthorized persons. Moreover, the systems described within U.S. Pat. Nos. 5,548,164 and 6,026,773 describe security systems which include switches which carry significant power between the battery and the power terminals of a starter solenoid. Unfortunately, the high power through such systems are susceptible to electrical noise, electric spikes and back EMF from the solenoid coil. In addition, heat from the power passing through the security system switch typically gives off significant heat which can damage the electronic components of the security system.

It is therefore an object of the present invention to provide a new and improved security system for vehicles.

It is a further object of the present invention to provide a vehicle security system which is both inexpensive and reliable.

It is still an additional object of the present invention to provide a vehicle security system which can be constructed to reside within the engine compartment of virtually all vehicles.

It is still an additional object of the present invention to provide a vehicle security system which can operate in connection with a variety of coding systems, such as key coding, RF coding, etc.

SUMMARY OF THE INVENTION

The present invention addresses the aforementioned disadvantages by providing an improved security system for impeding the unauthorized operation of a vehicle. The security system includes a security module which connects to one or more crucial electrical subsystems of the vehicle for disabling engine ignition or engine operation. Electrical subsystems include the vehicle solenoid, the starter motor, the battery and the distributor. The security module is connected in series with an electrical conductive path which connects any of these subsystems to the rest of the vehicle electrical system for selectively interrupting current along these electrically conducting paths for disabling the particular vehicle subsystem.

In a first embodiment of the invention, the security module is connected between the vehicle's ignition switch and the initiate stud of the vehicle's solenoid. In an alternative embodiment, the security module of the present invention is connected in series between the battery and ignition switch. Where the vehicle includes a solenoid and starter motor constructed as one unit, such as is installed in many Ford vehicles, the security module of the present invention is connected in series between a remote solenoid and the starter motor. The interruption of the current in any of these electrical paths will disable a vital subsystem of the vehicle making it virtually impossible to start the vehicle's engine.

In accordance with the present invention, the security module attaches and locks directly to an electrical terminal of the vehicle subsystem which is intended to be disabled. To this end, the security module includes a housing having an opening at the bottom exterior of the housing which opens into a central bore. The bore is sized and configured for receipt of the electrical terminal of the vehicle subsystem for which it is intended to receive. Moreover, the security module includes a locking means for locking the housing to the electrical terminal of the vehicle subsystem so that once installed upon the electrical terminal, the security module cannot be removed without removal of the entire vehicle subsystem from the vehicle. In a preferred embodiment, the locking assembly includes one or more of jaws which are disposed within the housing's central bore. The bore's sidewalls are tapered so that the bore is more narrow towards its opening and widens upwardly towards the housing's center. The locking means further includes a spring disposed within the housing's bore for biasing the one or more jaws downwardly and inwardly towards the bore's opening.

The security module is installed upon a vehicle subsystem's electrical terminal simply by projecting the terminal upwardly and inwardly into the housing's bore. Upon the electrical terminal engaging the locking assembly's jaws, the jaws project upwardly and outwardly as the security module is forced downwardly upon the electrical terminal permitting the electrical terminal to project into the module's bore. However, the security module cannot easily be removed from the electrical terminal as any force exerted upon the security module to remove the module from the electrical terminal will simply cause the jaws to be forced downwardly and inwardly towards the narrow region of the housing's bore, thereby causing the jaws to grip the electrical terminal more tightly. Thus, once installed, the security module cannot be removed from a vehicle subsystem's electrical terminal and the electrical terminal is covered and isolated by the security module's housing to prohibit any physical or electrical access to the electrical terminal.

Located within the security module's housing is a controller and a switching element which is connected in series between the jaws engaging the vehicle subsystem's electrical terminal and the electrically conductive path along which current is intended to flow either to or from the electrical terminal. The controller may comprise a printed wiring board, digital code reader, micro controller, or the like for controlling the switching element from an open to a closed position upon receipt of enable or disable command for enabling and disabling the security system of the present invention. The enable and disable commands may be transmitted by a wireless RF transmitter which may be either affixed within the vehicle or carried by an authorized driver of the vehicle. In the alternative, the enable and disable commands may be transmitted by a activation module which is connected by wires or cable to the controller of the security module. The activation module is preferably mounted in the cabin of the vehicle, such as below the dashboard, and is activated by electrically coded keys, mechanically coded keys, digital entry keypads, electro-optically coded keys or radio frequency keys.

In a preferred embodiment of the invention, the security module of the present invention is affixed and locked directly to the initiator stud of the vehicle's solenoid. The solenoid is connected in series to the vehicle's ignition switch through the locking assembly's jaws, the switching element and the electrically conductive path which, in this case, is the cable which would ordinarily be routed from the ignition switch directly to the initiate stud of the vehicle solenoid. Advantageously, by interrupting current to the initiate stud, the switching element does not encounter high current and thus less expensive switching elements can be employed. Moreover, the low current passing through the switching element is less prone to cause heat or electrical interference which can damage the security module's controller.

The security system of the present invention provides for virtually universal application to all vehicles as the security module can be constructed to engage the initiate studs of a variety of different vehicle solenoids, and can even be constructed to engage the electrical terminals of a variety of different crucial vehicle electrical subsystems such as the vehicle's battery or starter motor.

In addition, the security system of the present invention can be used in cooperation with virtually any type of known coding system such as mechanical key coding, RF coding, keypad coding, etc.

Other features and advantages of the present invention will be appreciated by those skilled in the art upon reading the detailed description which follows with reference to the attached drawings.

DETAILED DESCRIPTION OF THE INVENTION

While the present invention is susceptible of embodiment in various forms, there is shown in the drawings and will hereinafter be described the presently preferred embodiments of the invention with the understanding that the present disclosure is to be considered as an exemplification of the invention and it is not intended to limit the invention to the specific embodiments illustrated.

Figure 7:
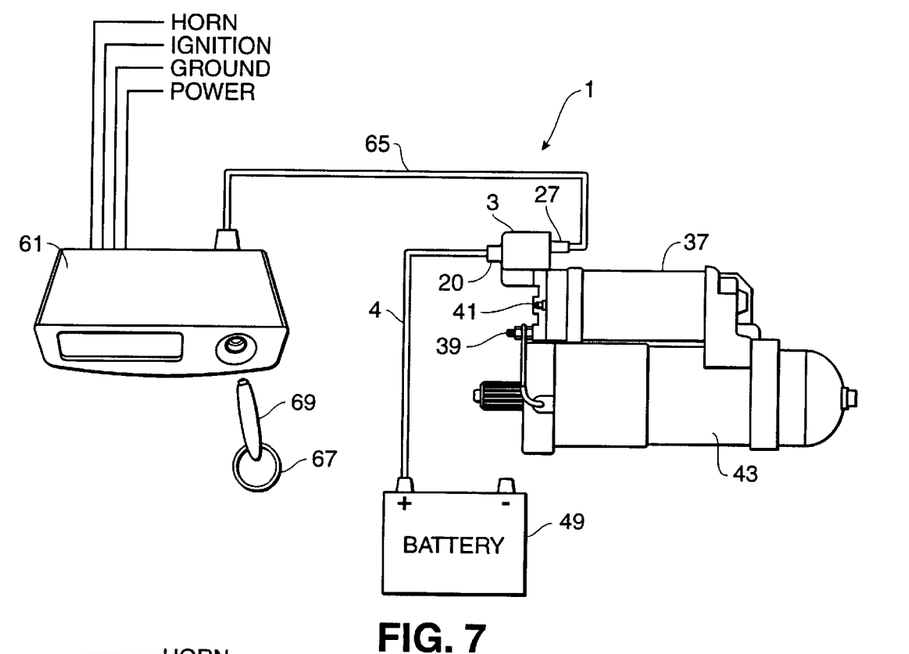
FIG. 7 illustrates a layout of a preferred embodiment of the security system of the present invention.

With reference to the figures, and with particular reference to FIGS. 1, 2, 7 and 8, the security system 1 of the present invention includes a security module 3 which is connected in series with a crucial electrical path 4 necessary for engine ignition or continued engine operation. As shown in FIG. 7, the security module 3 is connected in series with the crucial electrical path 4 extending between the engine's ignition switch 57 and a vehicle solenoid 37. However, the security module 3 of the present invention may be connected in series with any crucial electrical path 4 which is necessary for engine ignition or continued operation of the vehicle's engine, such as between the battery 47 and ignition switch 57, between the vehicle solenoid 37 and engine starter motor 43 (applicable for some vehicles), or between the vehicle's main electrical bus and the engine distributor.

Figure 1:
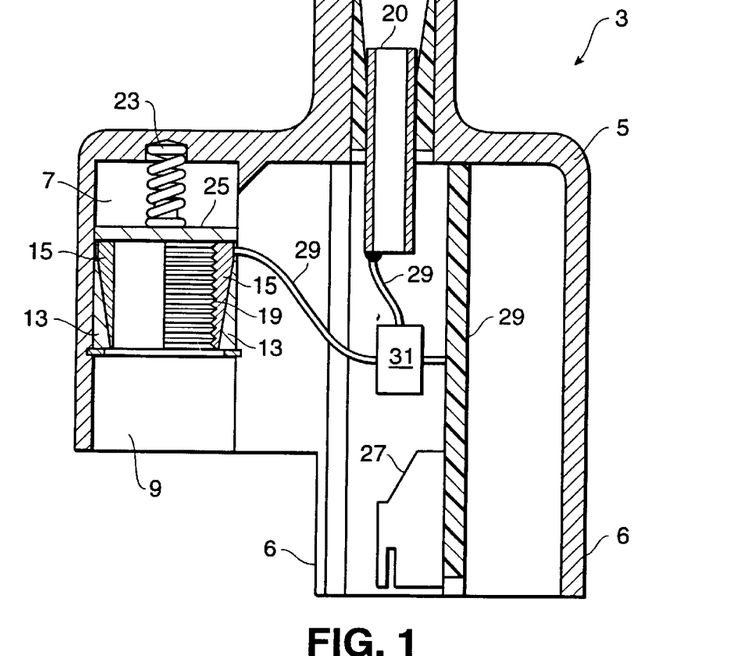
FIG. 1 is a cross-sectional view of the security module of the present invention.
Figure 2:
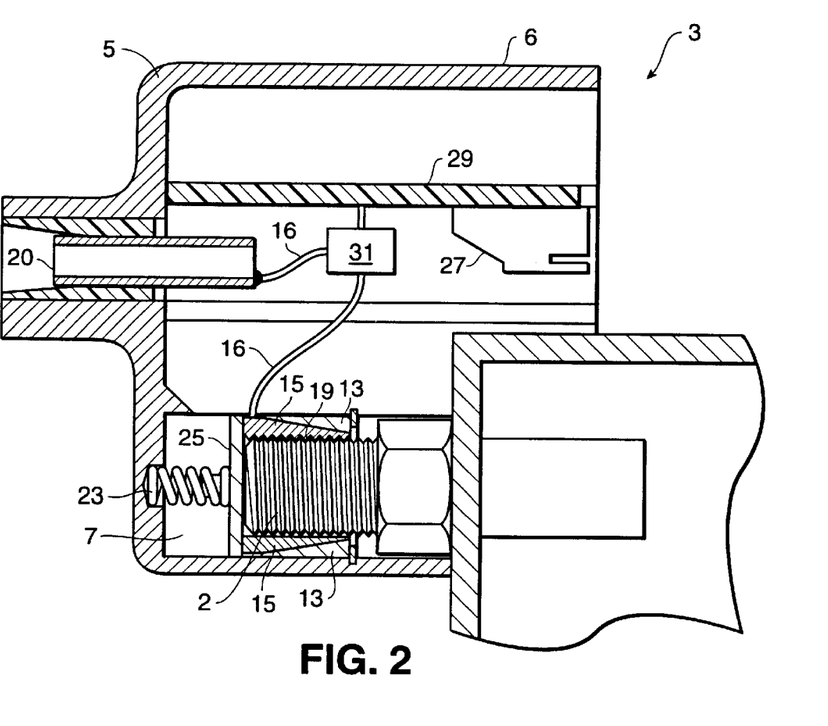
FIG. 2 is a cross-sectional view of the security module taken generally along section 2—2 of FIG. 3 illustrating the security module affixed to and isolating the initiate stud of a vehicle solenoid.
Figure 5:
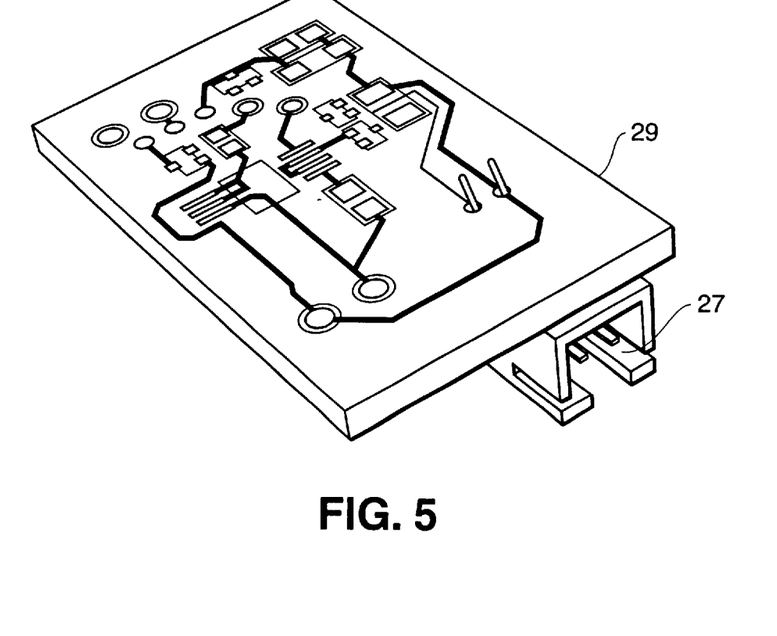
FIG. 5 illustrates a printed wiring board which can be used as a controller for controlling operation of the security module of the present invention.

With reference to FIGS. 1 and 2, the security system 1 further includes a housing 5, and a switching element 31 and a controller 29 which are located within the security module housing 5. The controller 29 controls operation of the switch which opens or closes to selectively permit or obstruct the flow of current along the electrical path 4 sought to be controlled, which in-turn controls the enablement and disablement of the vehicle subsystem required for engine ignition or operation. Preferably, the switching element 31 is a solid state device, a device that is composed primarily or exclusively of solid materials, such as a silicon controlled rectifier (SCR). In the alternative, preferably the switching element 31 includes one or more metal oxide silicon field effect transmitters (MOSFETs). The switching element 31 is controlled by the controller 29 which may be a printed wiring board (see FIG. 5) or more preferably is a sixty-four bit addressable switch, also known as a "digital code reader", which reads enable and disable commands which take the form of a sixty-four bit code. Where the sixty-four bit enable or disable commands are recognized as being acceptable for authorized enablement or disablement of the security system 1, the addressable switch causes the switching element 31 to either open or close as requested. For example, where a sixty-four bit enable command has been received by the addressable switch, the addressable switch causes the security system 1 to enter into an "enable mode" wherein the security system 1 is activated and the switching element 31 opens to stop the flow of current to the vehicle subsystem which is intended to be disabled.

Figure 6:
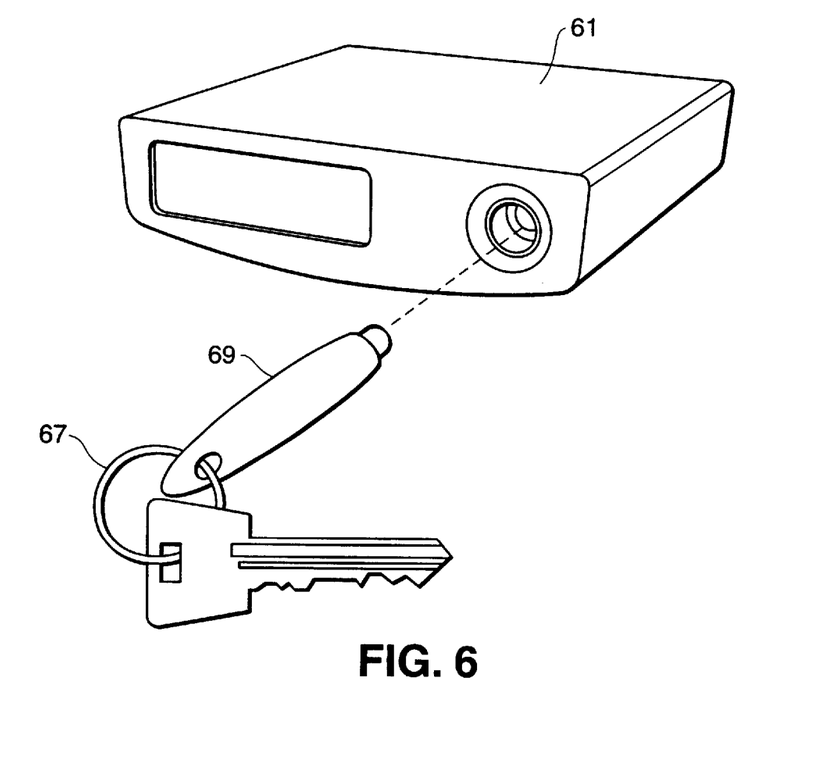
FIG. 6 illustrates an activation module which would typically be mounted below the dashboard of a vehicle for transmitting enable and disable codes to the controller of the security module of the present invention.
Figure 8:
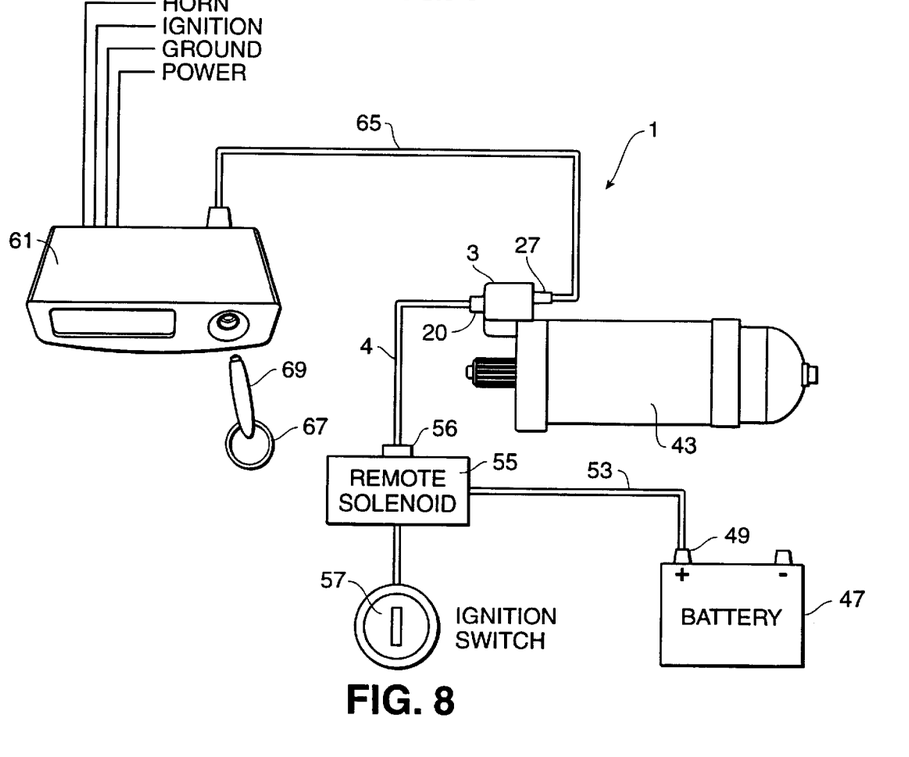
FIG. 8 illustrates a layout of an additional preferred embodiment of the security system of the present invention.

The enable and disable commands may be transmitted by numerous means known by those skilled in the art. For example, the enable commands may be transmitted by a remote RF transmitter which can be located within the cab of the vehicle, or may be carried by a person such as upon their key chain 67. The RF transmitter typically would include a plurality of buttons for enabling or disabling the security system 1 and may include a button directed to activating an alarm for sounding a horn or the like. In an alternative embodiment for transmitting the enable and disable commands to the security module 3, as shown in FIGS. 6, 7 and 8, the security system 1 of the present invention includes an activation module 61 which is electrically connected to the security module 3 by a data cable 65 and an electrical connector 27. The activation module 61 may be located anywhere on the vehicle which is accessible by the driver to enable and disable the security system 1. Preferably, the activation module 61 is located within the cab of the vehicle below the dashboard for ease of access by the driver immediately prior to the driver causing the engine to start. The activation module 61 may be controllable by any coding means known to those skilled in the art such as mechanical key coding, keypad coding, electro-optical key coding or the like. In a preferred embodiment, the activation module 61 includes a processor which analyzes receipt of a sixty-four bit code transmitted by a touch key 69 which may be carried on a person's key chain 67. In operation, the authorized user of the vehicle touches the key 69 to the activation module 61 thereupon transmitting a first sixty-four bit code from the touch key 69 to the activation module 61. If the code is recognized, the activation module 61 sends an enable command or disable command, including a different sixty-four bit code, to the security module 3 along system data cable 65 and electrical connector 27. The use of dual sixty-four bit codes provides additional protection against unauthorized attempts to deactivate the security system 1.

It is an additional object of the present invention that the security module 3 for interrupting current of a crucial electrical path 4 be mounted and locked directly to the vehicle's subsystem which is intended to be disabled. More particularly, it is an object of the invention that the security module 3 be attached and locked directly to an electrical terminal 2 of the vehicle subsystem so that removal of the security module 3 cannot be effected without removal of the subsystem from the vehicle. To this end, the security system 1 of the present invention includes a locking assembly for locking the security module 3 directly to an electrical terminal 2 of a crucial vehicle subsystem for selectively interrupting current to or from the vehicle subsystem.

Figure 3:
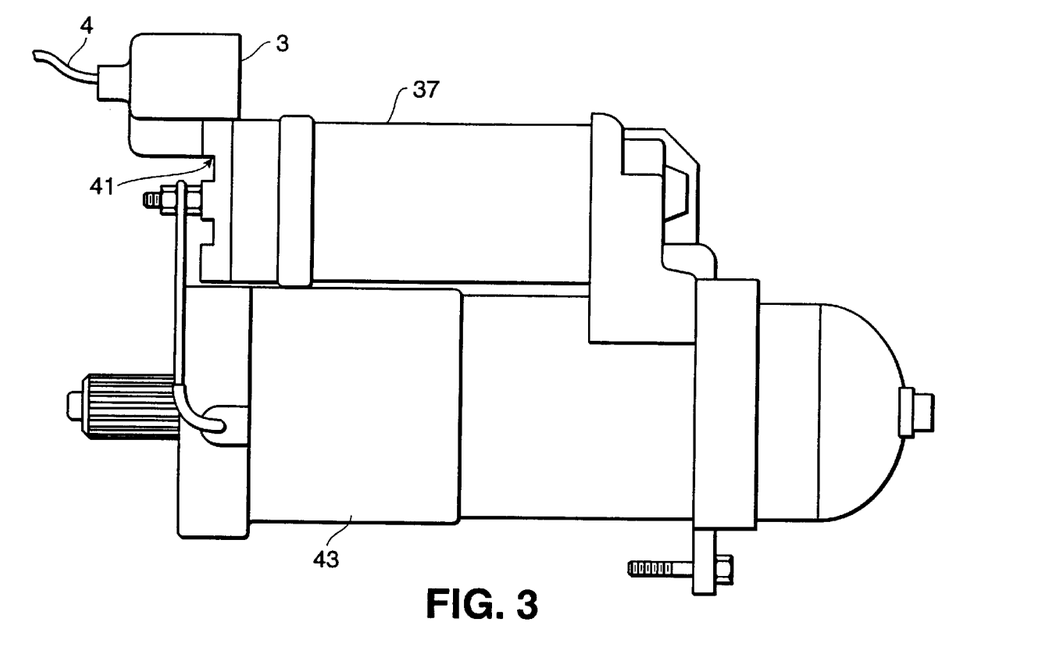
FIG. 3 is a side view illustrating the attachment of the security module of FIGS. 1 and 2 attaching to the initiate stud of a vehicle solenoid mounted on top of a vehicle starter motor.
Figure 4:
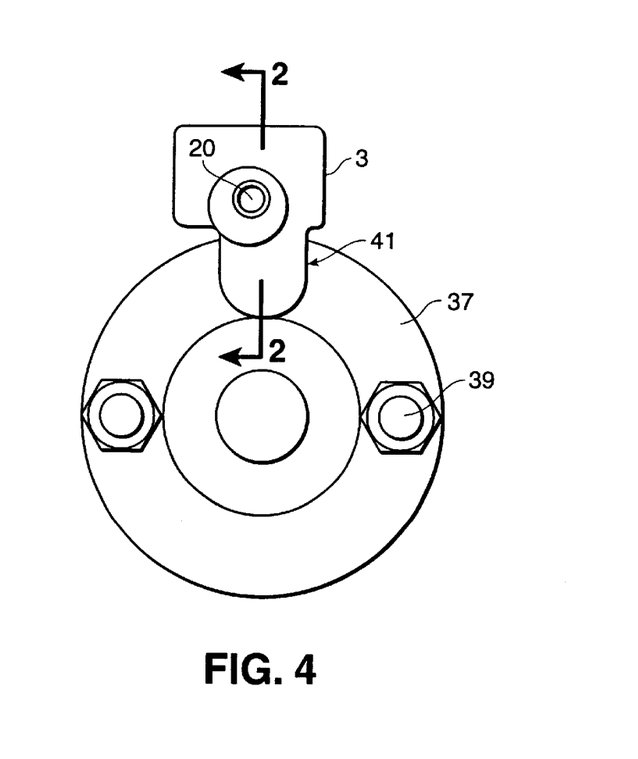
FIG. 4 is a front view of the security module of the present invention attached and isolating the initiate stud of a vehicle solenoid.

With reference to FIGS. 1 and 2, in a preferred embodiment, for locking the security module 3 to an electrical terminal 2, the security module 3 includes a housing 5 having an opening 9 at its bottom exterior which opens into a central bore 7. As would be understood by those skilled in the art, the housing 5 will be described herein as having its opening 9 at its bottom exterior, however, depending on the position of the security module 3 as it is affixed to a vehicle subsystem, the opening 9 may be positioned on the side of the housing 5 or on its top without departing from the spirit and scope of the invention. For example, FIGS. 2, 3 and 4 show the security module 3 oriented so that the opening 9 is on the housing's 5 right side. The bore 7 is sized and configured for receipt of an electrical terminal 2 which can be telescopically received within the bore 7. Moreover, the bore 7 includes sidewalls 13 which are tapered outwardly from the housing's opening 9. The locking assembly for locking the security module 3 includes one or more jaws 15 which are concentrically located within the bore 7 adjacent to the bore's tapered sidewalls 13. The jaws 15 may include a serrated edge 19 for engaging the threads of an electrical terminal 2, or in the alternative, the jaws 15 have a smooth edge. In addition, the locking assembly preferably includes a spring 23 and a biasing plate 25 which are located within the housing's bore 7 for biasing the jaws 15 toward the housing's opening 9. Due to the tapered construction of the bore's sidewalls 13, the jaws 15 are forced inwardly and downwardly (wherein the housing's opening 9 is at the bottom of the security module 3). When the security module 3 is attached and locked to a vehicle subsystem's electrical terminal 2, the electrical terminal 2 is forced into the housing's bore 7 which forces the jaws 15 upwardly and outwardly allowing full receipt of the electrical terminal 2 until the security module 3 fully covers the electrical terminal 2 upon the module engaging the side of the vehicle subsystem. Meanwhile, the security module 3 cannot easily be removed by force from the electrical terminal 2 as any force exerted upon the security module 3 to remove the module from the electrical terminal 2 will simply cause the jaws 15 to be forced inwardly to grip the electrical terminal 2 more tightly.

Preferably, the jaws 15 are manufactured of a highly electrically conductive material such as copper which is electrically connected to the switching element 31 by a wire 16. Moreover, it is preferred that the housing 5 or tapered inner walls 13 be manufactured of a substantially electrically insulating material so as to electrically isolate the electrical terminal 2 of the vehicle subsystem, except for current which is transmitted through wires 16, switching element 31 and electrical connector 20 which connects the crucial electrical path 4 to the controller 29. In addition, it is preferred that the housing 5 be manufactured of an extremely durable material, such as hard plastic or metals including steel and aluminum to impede physical tampering with the security module and its components.

As shown in FIGS. 1–4, preferably the security module 3 is constructed so that the housing 5 is constructed with a projection 6 which projects below the opening 9. The projection 6 is provided and constructed to extend along the vehicle subsystem sidewall 13 so that once the security module 3 has been installed upon the electrical terminal 2, the security module 3 cannot be rotated upon the electrical terminal 2 as any rotation of the security module 3 would cause the projection 6 to engage the vehicle subsystem's exterior sidewall. This construction is preferable to inhibit rotation of the security module 3 upon the threads of the electrical terminal 2 which would otherwise permit the security module 3 to be disengaged and removed from the vehicle subsystem.

With reference to FIGS. 2–4, in a preferred embodiment, the security module 3 attaches and locks directly to the initiate stud 41 of a solenoid 37. Electrical current to the winding of a starter solenoid 37 causes a plunger to move which both closes a circuit from the battery 47 to the starter motor 43 and simultaneously actuates a shift lever which forces a pinion gear into meshing engagement with the flywheel. The electrical current which thereafter flows to the starter motor mechanically rotates the pinion gear and in-turn rotates the engine to cause engine ignition. The current to the starter solenoid 37 is controlled by a low power current which is transmitted to the initiate stud 41 the solenoid 37. Accordingly, any disruption of the current to the initiate stud 41 will completely disable the starter solenoid 37.

Thus, the present invention provides for a security system 1 which completely disables the starter solenoid 37 to prevent vehicle theft unless the security system 1 is disabled by an authorized person. With reference also to FIGS. 6 and 7, this is accomplished by an authorized person engaging his touch key 69 to the activation module 61, causing a sixty-four bit disable command to be transmitted to the security module 3. Upon receipt of a recognized disable command, the controller 29 causes the switch 57 to shift to a closed position thereby permitting current to flow along the electrical path 4 to the initiate stud 41 of the solenoid 37 when the ignition switch 57 is turned. Conversely, the security system 1 can be enabled upon again engaging the touch key 69 to the activation module 61, or simply upon deactivation of the engine which is recognized by the activation module 61 as a condition for enabling the security system 1.

With reference to FIG. 7, in an alternative embodiment, the security module 3 is attached and locked directly to the power terminal 39 of a solenoid 37. This embodiment is not considered preferable to the construction wherein the security module 3 attaches directly to the initiate stud 41 as the switching element 31 located within the security module 3 must be constructed to carry significantly higher current. However, where the initiate stud 41 is difficult to reach within the engine compartment, the present invention provides for attaching the security module 3 to the power terminal 39 of the solenoid 37. Instead of interrupting current flowing through the ignition switch 57, the switching element 31 of the security module 3 interrupts power between the battery 47 and the power terminal 39 of the solenoid 37 when the security system 1 is activated.

The security system 1 is enabled in the same manner as the embodiment wherein the security module 3 is attached and locked to the initiate stud 41 of the solenoid 37. An authorized person enters a key code into the security system 1. As described above, these key coding systems may be of any type known to those skilled in the art. As shown in FIG. 7, a touch key 69 is engaged to a terminal on the activation module 61 to transmit a sixty-four bit code from the touch key 69 to the activation module 61. Where it is recognized as an authorized code, the activation module 61 transmits an enable command, in the form of a different sixty-four bit code, along system data cable 65 to security module 3. The internal controller 29 compares the sixty-four bit code to codes stored in memory. Where the code is recognized, the controller 29 causes switch 31 to open the circuit between the positive battery terminal 49 of the battery 47 and the high current terminal 39 of the solenoid 37. Once the security system 1 has been activated, the vehicle cannot be started without either disabling the security system 1 by entering authorized codes into the activation module 61 or by removing the solenoid 37 from the engine compartment and replacing it with another solenoid 37 which is not secured with a security module 3.

With reference to FIG. 8, some vehicles are provided with a solenoid/starter motor assembly which are not connected together and wherein the solenoid 37 does not include a shift level which forces the starter motor's pinion gear into meshing engagement with the flywheel. Instead, a remote solenoid 55 operates as a high current switch, simply routing high current from the battery 47 to a high current terminal 39 on the starter motor 43. The starter motor 43 contains its own mechanical mechanism for moving the pinion gear into meshing engagement with the flywheel for rotating the engine and initiating engine ignition. For engine systems such as these, in a preferred embodiment of the invention, the security module 3 is attached and locked directly to the power terminal 45 of the starter motor 43. Activation of the security system 1 into an enable mode interrupts current between the remote solenoid 55 and the starter motor 43. Thus, the starter motor 43 cannot be operated without disabling the security system 1 by an authorized person inputting recognized codes, or by removing the starter motor 43 and the security module 3 from the engine housing and replacing them with a starter motor 43 which is not disabled by a security module 3.

With reference still to FIG. 8, where the vehicle includes a solenoid 55 which is remotely situated from the starter motor 43, the security module 3 may be affixed and locked to the output current terminal 56 of the remote solenoid 55 to interrupt current between the remote solenoid 55 and the starter motor 43 when the security system 1 is enabled. This is not considered a preferred embodiment of the invention as this construction can be disabled easily by a vehicle thief temporarily routing an electrical connection between the positive terminal 49 of the battery 47 to the uncovered power terminal 45 of the starter motor 43. However, this embodiment may be employed where the power terminal 45 of the starter motor 43 is nearly impossible to reach either by a thief or by one attempting to affix a security module 3 to the starter motor 43.

In still an additional embodiment of the invention, the security module 3 is affixed and locked directly to the positive terminal 49 of a battery 47, to interrupt current between the battery 47 and the solenoid or starter motor. Enabling the security system 1 will interrupt current between the battery 47 and starter motor 43 until the security system 1 is disabled by an authorized person inputting recognized codes into the security system 1, or by constructing an alternative current path between the battery 47 and the starter motor. Again, the security system 1 of the present invention constructed in such manner provides only limited protection against a vehicle thief as a determined thief could simply utilize an additional battery and cabling to transmit current to the vehicle solenoid for engine ignition.

Although particular preferred embodiments of the present invention have been specifically described herein, it is to be understood that variations may be made in the construction, materials and layout of the vehicular security system without departing from the spirit and scope of the invention. Having described the invention in such terms to enable those skilled in the art to make and use it, and having identified the presently preferred embodiments thereof.

I claim:

1. A security system for disabling a vehicular subsystem for impeding unauthorized theft of a vehicle, the vehicular subsystem having at least one electrical terminal forming part of an electrically conductive path, the security system comprising:

a housing constructed to cover and isolate the electrical terminal of the vehicle subsystem, said housing including a projection for extending partially alongside the sidewall of a vehicle subsystem for restricting rotation of the housing relative to the vehicle subsystem once the housing has been installed to cover the electrical terminal of the vehicle subsystem;

an electrically conducting locking means for locking said housing directly to the electrical terminal of the vehicle subsystem;

a switch located within said housing and connected in series with said electrically conducting locking means and said electrically conductive path, said switch operable to open in response to receipt of an enable signal and to close in response to receipt of a disable signal; and a controller for sending a enable signal to said switch for enabling the security system and for sending a disable signal to said switch for disabling the security system.

2. The security system of claim 1 wherein the vehicular subsystem is a vehicle solenoid and said electrically conductive locking means is constructed to lock directly to the initiate stud of the vehicle solenoid.

3. The security system of claim 1 wherein the vehicular subsystem is a vehicle solenoid and said electrically conductive locking means is constructed to lock directly to a power terminal of the vehicle solenoid.

4. The security system of claim 1 wherein the vehicular subsystem is a vehicle battery and said electrically conductive locking means is constructed to lock directly to a power terminal of the vehicle battery.

5. The security system of claim 1 further comprising:

an RF receiver connected to said controller for receiving commands which control the sending of the enable and disable signals to said switch; and an RF transmitter intended to be operated by authorized persons for transmitting commands to said RF receiver for enabling and disabling the security system.

6. The security system of claim 1 further comprising:

a manually operated switch connected to said controller, said manually operated switch for being located within the cab of a vehicle and intended to be operated by authorized persons for transmitting commands to said controller for enabling and disabling the security system.

7. The security system of claim 1 wherein:

said housing has a tapered bore which opens at the bottom exterior of said housing for receipt of an electrical terminal with said bore being tapered to widen upwardly away from the exterior of said housing and to narrow downwardly toward the opening of said bore; and said electrically conducting locking means includes one or more electrically conductive jaws disposed within said tapered bore, said jaws being slidably to move upwardly and downwardly within said tapered bore, said jaws being electrically connected in series with said electrical terminal and said electrically conductive path; and a biasing means disposed within said housing for biasing said electrically conductive jaws toward the narrow portion of said bore.

8. The security system of claim 7 wherein the vehicular subsystem is a vehicle solenoid and said electrically conductive locking means is constructed to lock directly to the initiate stud of the vehicle solenoid.

9. The security system of claim 7 wherein the vehicular subsystem is a vehicle solenoid and said electrically conductive locking means is constructed to lock directly to the power terminal of the vehicle solenoid.

10. A security system for disabling a vehicular subsystem for impeding unauthorized theft of a vehicle, the security system comprising:

a vehicular subsystem having at least one electrical terminal forming part of an electrically conductive path;

a housing covering and isolating said electrical terminal of said vehicle subsystem, said housing including a projection for extending partially alongside the sidewall of a vehicle subsystem for restricting rotation of the housing relative to the vehicle subsystem once the housing has been installed to cover the electrical terminal of the vehicle subsystem;

an electrically conducting locking means for locking said housing directly to said electrical terminal of the vehicle subsystem;

a switch located within said housing and connected in series with said electrically conducting locking means and said electrically conductive path, said switch operable to open in response to receipt of an enable signal and to close in response to receipt of a disable signal; and a controller for sending a enable signal to said switch for enabling the security system and for sending a disable signal to said switch for disabling the security system.

11. The security system of claim 10 wherein said vehicular subsystem is a vehicle solenoid and said electrically conductive locking means is constructed to lock directly to the initiate stud of said vehicle solenoid.

12. The security system of claim 10 wherein said vehicular subsystem is a vehicle solenoid and said electrically conductive locking means is constructed to lock directly to a power terminal of said vehicle solenoid.

13. The security system of claim 10 wherein said vehicular subsystem is a vehicle battery and said electrically conductive locking means is constructed to lock directly to a power terminal of said vehicle battery.

14. The security system of claim 10 further comprising:

an RF receiver connected to said controller for receiving commands which control the sending of the enable and disable signals to said switch; and an RF transmitter intended to be operated by authorized persons for transmitting commands to said RF receiver for enabling and disabling the security system.

15. The security system of claim 10 further comprising:

a manually operated switch connected to said controller, said manually operated switch for being located within the cab of a vehicle and intended to be operated by authorized persons for transmitting commands to said controller for enabling and disabling the security system.

16. The security system of claim 10 wherein:

said housing has a tapered bore which opens at the bottom exterior of said housing for receipt of an electrical terminal with said bore being tapered to widen upwardly away from the exterior of said housing and to narrow downwardly toward the opening of said bore; and said electrically conducting locking means includes one or more electrically conductive jaws disposed within said tapered bore, said jaws being slidably to move upwardly and downwardly within said tapered bore, said jaws being electrically connected in series with said electrical terminal and said electrically conductive path; and a biasing means disposed within said housing for biasing said electrically conductive jaws toward the narrow portion of said bore.

17. The security system of claim 16 wherein the vehicular subsystem is a vehicle solenoid and said electrically conductive locking means is constructed to lock directly to the initiate stud of the vehicle solenoid.

18. The security system of claim 16 wherein the vehicular subsystem is a vehicle solenoid and said electrically conductive locking means is constructed to lock directly to the power terminal of the vehicle solenoid.

19. The security system of claim 16 wherein the vehicular subsystem is a vehicle battery and said electrically conductive locking means is constructed to lock directly to a power terminal of the vehicle battery.

20. A security module for restricting access to an electrical terminal comprising:

an electrical terminal connected to an electrically conductive path;

a locking housing constructed to cover and isolate said electrical terminal, said housing having a tapered bore which opens at the bottom exterior of said housing for receipt of said electrical terminal with said bore being tapered to widen upwardly away from the exterior of said housing and to narrow downwardly toward the opening of said bore;

one or more electrically conductive jaws disposed within said tapered bore, said jaws being slidably to move upwardly and downwardly within said tapered bore, said jaws being electrically connected in series with said electrical terminal and said electrically conductive path; and biasing means disposed within said housing for biasing said electrically conductive jaws toward the narrow portion of said bore.

21. The security module for restricting access to an electrical terminal of claim 20 further comprising a switch located within said locking housing and connected in series with said electrically terminal, said electrically conductive path, and said electrically conductive jaws, said switch operable to open and close an electrical circuit.

22. The security module for restricting access to an electrical terminal of claim 20, wherein said locking housing is constructed of a substantially non-electrically conductive material to electrically isolate said electrical terminal.

23. The security module for restricting access to an electrical terminal of claim 20, wherein said locking housing is electrically isolated from said housing so as to electrically isolate said electrical terminal.

\* \* \* \* \*